United States Patent
Shi

(10) Patent No.: US 12,130,358 B2
(45) Date of Patent: Oct. 29, 2024

(54) SENSOR ASSEMBLY FOR VEHICLE AND VEHICLE

(71) Applicant: NIO TECHNOLOGY (ANHUI) CO., LTD, Hefei (CN)

(72) Inventor: Jiepei Shi, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 286 days.

(21) Appl. No.: 17/749,297

(22) Filed: May 20, 2022

(65) Prior Publication Data
US 2022/0379822 A1 Dec. 1, 2022

(30) Foreign Application Priority Data
May 25, 2021 (CN) .......................... 202121130324.9

(51) Int. Cl.
*G01S 13/931* (2020.01)
*B60R 11/00* (2006.01)

(52) U.S. Cl.
CPC ....... *G01S 13/931* (2013.01); *B60R 2011/004* (2013.01); *G01S 2013/9327* (2020.01)

(58) Field of Classification Search
CPC ........... G01S 13/931; G01S 2013/9327; B60R 2011/004
See application file for complete search history.

(56) References Cited

U.S. PATENT DOCUMENTS
9,491,338 B1 11/2016 Garcia et al.

FOREIGN PATENT DOCUMENTS
GB 2129987 5/1984

OTHER PUBLICATIONS
Extended Search Report for European Patent Application No. 22165408.0, dated Sep. 20, 2022, 10 pages.

*Primary Examiner* — Michael D Lang
(74) *Attorney, Agent, or Firm* — Sheridan Ross P.C.

(57) ABSTRACT

The disclosure relates to a sensor assembly for a vehicle, comprising: a sensor body; and a positioning bracket for positioning the sensor body. A first rotary shaft and a second rotary shaft are respectively provided on the opposing first and second sides of the sensor body, and the first rotary shaft and the second rotary shaft are respectively rotatably accommodated in a first rotary shaft receiving portion and a second rotary shaft receiving portion provided on the positioning bracket so as to achieve the rotation of the sensor body relative to the positioning bracket. A toothed structure is provided on a third side of the sensor body, other than the first side and the second side, and a detent structure is correspondingly provided on the positioning bracket, and when the sensor body rotates to a desired angle relative to the positioning bracket, fixing of the sensor body relative to the positioning bracket is enabled by means of the engagement between the toothed structure and the detent structure. The disclosure further relates to a vehicle comprising the sensor assembly.

9 Claims, 2 Drawing Sheets

SENSOR ASSEMBLY FOR VEHICLE AND VEHICLE

CROSS-REFERENCE TO RELATED APPLICATION

This application claims the benefit of China Patent Application No. 202121130324.9 filed May 25, 2021, the entire contents of which are incorporated herein by reference in its entirety.

TECHNICAL FIELD

The disclosure relates to the technical field of vehicles, and more particularly to a sensor assembly for a vehicle and a vehicle comprising the sensor assembly.

BACKGROUND ART

At present, sensors for automatic driving such as a vehicle-mounted camera and a radar need to calibrate a target before use, which requires that the installation accuracy of sensors is within a certain tolerance range, otherwise, the calibration will fail. The angular accuracy of the camera and the radar exceeding a target range is one of the most likely causes of calibration failure.

Therefore, there is a need in the art for a novel sensor assembly in order to achieve the angular accuracy required for calibration of the camera and the radar.

SUMMARY OF THE DISCLOSURE

In view of the above, embodiments of the disclosure provide a sensor assembly for a vehicle and a vehicle comprising the sensor assembly, in order to effectively solve or alleviate at least one of currently existing disadvantages, or to meet at least one of current requirements.

According to an aspect, the embodiments of the disclosure relate to a sensor assembly for a vehicle, comprising:
a sensor body; and
a positioning bracket for positioning the sensor body, wherein
a first rotary shaft and a second rotary shaft are respectively provided on opposing first and second sides of the sensor body, and the first rotary shaft and the second rotary shaft are respectively rotatably accommodated in a first rotary shaft receiving portion and a second rotary shaft receiving portion provided on the positioning bracket so as to achieve the rotation of the sensor body relative to the positioning bracket; and
a toothed structure is provided on a third side of the sensor body, other than the first side and the second side, and a detent structure is correspondingly provided on the positioning bracket, and when the sensor body rotates to a desired angle relative to the positioning bracket, fixing of the sensor body relative to the positioning bracket is enabled by means of the engagement between the toothed structure and the detent structure.

Optionally, in the sensor assembly, the positioning bracket comprises opposing first and second sidewalls, the sensor body is installed between the first sidewall and the second sidewall such that the first side and the second side of the sensor body are respectively adjacent to the first sidewall and the second sidewall.

Optionally, in the sensor assembly, the first rotary shaft receiving portion and the second rotary shaft receiving portion are respectively provided on the first sidewall and the second sidewall.

Optionally, in the sensor assembly, the first rotary shaft receiving portion and the second rotary shaft receiving portion are respectively rotary shaft sleeves extending relative to each other from the first sidewall and the second sidewall.

Optionally, in the sensor assembly, the positioning bracket further comprises a connecting wall connecting the first sidewall to the second sidewall, the third side of the sensor body is adjacent to the connecting wall, and the detent structure is provided on the connecting wall.

Optionally, in the sensor assembly, the connecting wall is formed as a top portion of the positioning bracket, and the toothed structure is provided on a side edge of the top portion of the sensor body.

Optionally, in the sensor assembly, the sensor comprises a camera, a radar, or a combination thereof.

Optionally, in the sensor assembly, the toothed structure comprises a rack.

Optionally, in the sensor assembly, the detent structure comprises a reed that can be snapped into any one of notches in the toothed structure.

On another aspect, the embodiments of the disclosure relate to a vehicle comprising the sensor assembly described above.

BRIEF DESCRIPTION OF THE DRAWINGS

The disclosure will be further described below in detail in conjunction with the accompanying drawings and the preferred embodiments. However, those skilled in the art would have appreciated that these drawings are drawn merely for the purpose of illustrating the preferred embodiments, and thus should not be taken as limitation on the scope of the disclosure. In addition, unless otherwise specified, the drawings are merely intended to be conceptually illustrative of the constitution or construction of described objects and may include exaggerated representations, and the drawings are not necessarily drawn to scale. Furthermore, in different drawings, the same reference numerals denote the same or substantially the same components.

DETAILED DESCRIPTION OF EMBODIMENTS

Figure 1:
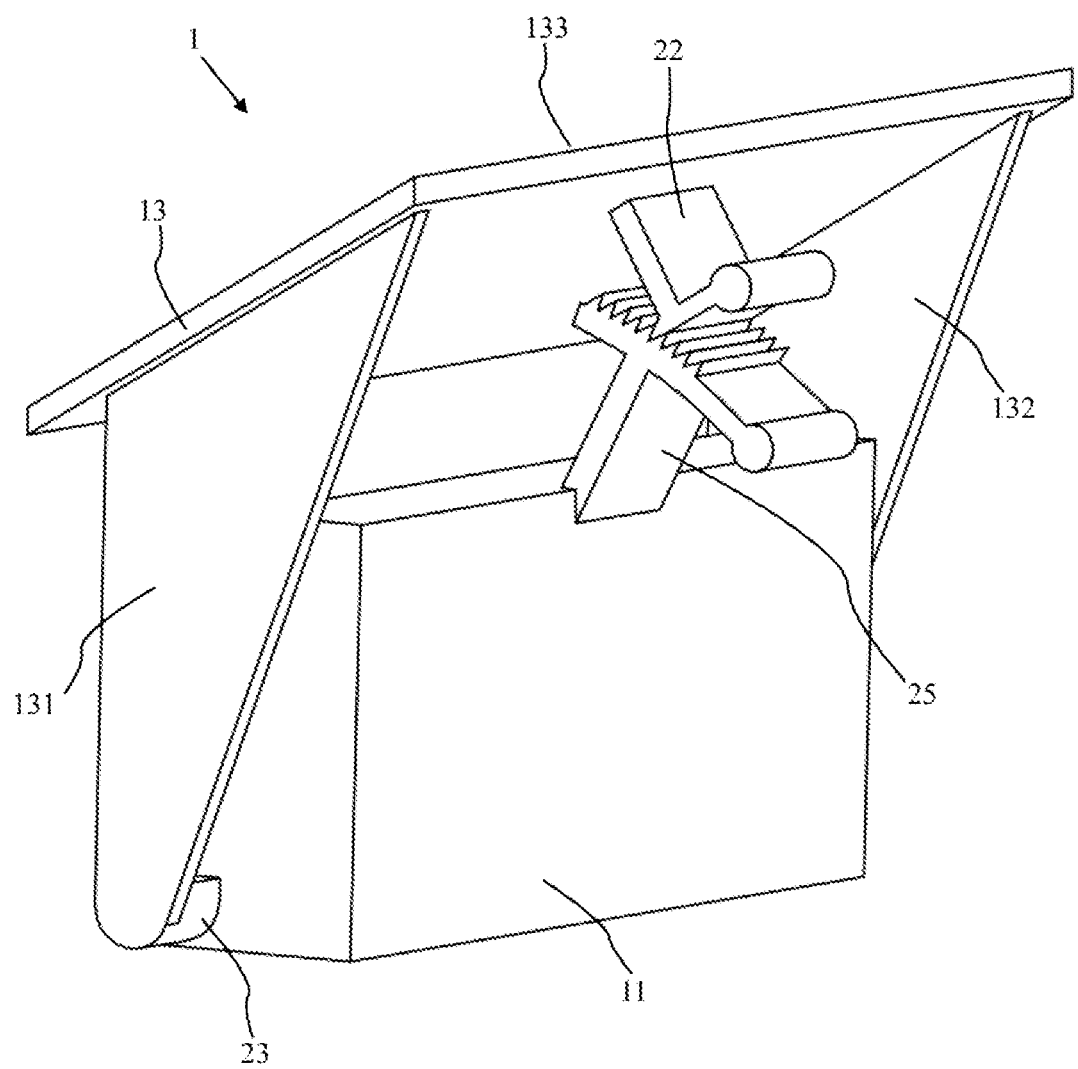
FIG. 1 is a perspective schematic diagram of an exemplary sensor assembly according to an embodiment of the disclosure.

Some embodiments of the disclosure will now be described in more detail in conjunction with the accompanying drawings. Unless expressly defined otherwise herein, scientific and technical terms used herein have the meanings that are commonly understood by those of skill in the art.

The orientation terms such as "top", "bottom", "front" and "back" referred to herein are defined with respect to the orientations in the drawings, and they are relative concepts and can thus vary depending on their different practical locations. Therefore, these or other orientation terms should not be construed as limiting terms.

The terms "comprising" and "having", and similar words used herein means that items other than those listed thereafter and equivalents thereof are also within the scope of the disclosure. The terms "or" and "either" are not meant to be exclusive, but rather refer to the presence of at least one of referenced items, and include the case where a combination of the referenced items may be present. The term "and/or" includes any and all combinations of one or more of the referenced items. The terms such as "some embodiments" mentioned herein means that a particular element (for example, a feature, a structure, and/or a characteristic) described relevant with the disclosure is included in at least one embodiment described in this specification, and may or may not be present in other embodiments. In addition, it should be understood that described inventive elements may be combined in any suitable manner.

According to an aspect, the embodiments of the disclosure relate to a sensor assembly for a vehicle, in which the angle of a sensor relative to its positioning bracket is adjustable, so that after the sensor is assembled at a target position by means of the positioning bracket, the angle of the sensor can also be adjusted with respect to the positioning bracket to obtain the angular accuracy required for calibrating the sensor. The sensor may comprise a camera, a radar, or a combination thereof.

Figure 2:
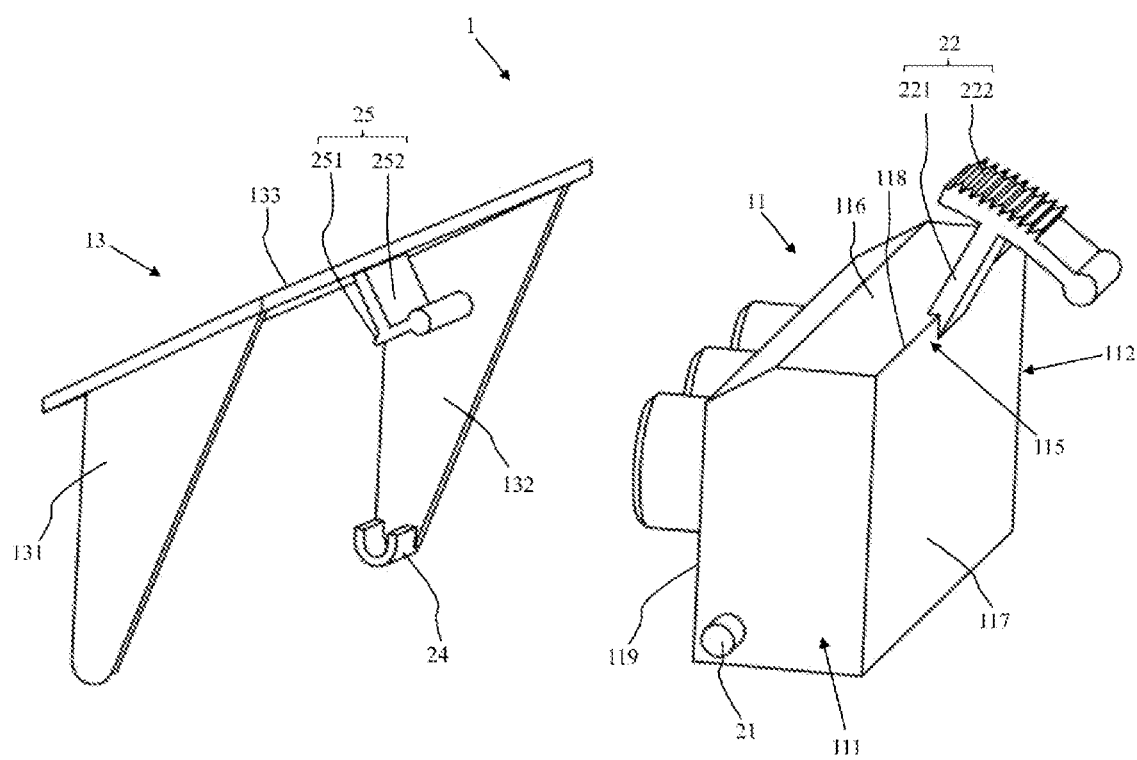
FIG. 2 is an exploded schematic diagram of the sensor assembly shown in FIG. 1.

As shown in FIGS. 1 and 2, a sensor assembly 1 comprises a sensor body 11 and a positioning bracket 13 for positioning the sensor body 11. A first rotary shaft 21 and a second rotary shaft (not visible in the figures) are respectively provided on opposing first side 111 and second side 112 of the sensor body 11, and the positioning bracket 13 is correspondingly provided with a first rotary shaft receiving portion 23 and a second rotary shaft receiving portion 24. The first rotary shaft 21 and the second rotary shaft are respectively rotatably accommodated in the first rotary shaft receiving portion 23 and the second rotary shaft receiving portion 24 to achieve rotation of the sensor body 11 relative to the positioning bracket 13. A toothed structure 22 is provided on a third side 115 of the sensor body 11, and a detent structure 25 is correspondingly provided on the positioning bracket 13. When the sensor body 11 rotates to a desired angle relative to the positioning bracket 13, fixating of the sensor body 11 relative to the positioning bracket 13 is achieved by means of the engagement between the toothed structure 22 and the detent structure 25. The third side 115 refers to a side other than the first side 111 and the second side 112, and may be, for example, a top side, an inclined upper side between the top side and the outer side.

The positioning bracket 13 may comprise opposing first sidewall (such as a left sidewall) 131 and second sidewall (such as a right sidewall) 132, which may roughly parallelly extend. The sensor body 11 is installed between the first sidewall 131 and the second sidewall 132 such that the first side 111 and the second side 112 of the sensor body 11 are respectively adjacent to the first sidewall 131 and the second sidewall 132.

The first rotary shaft receiving portion 23 and the second rotary shaft receiving portion 24 may be respectively provided on the first sidewall 131 and the second sidewall 132. For example, in the illustrated embodiment, the first rotary shaft receiving portion 23 and the second rotary shaft receiving portion 24 are rotary shaft sleeves respectively extending relative to each other from the inner sides of the first sidewall 131 and the second sidewall 132, the cross sections of the rotary shaft sleeves are semicircular with openings facing upward. In other embodiments, the rotary shaft sleeves may be in the shape of a complete circular ring, or may be in any other suitable shape.

In some embodiments, the positioning bracket 13 further comprises a connecting wall 133 connecting the first sidewall 131 to the second sidewall 132, the third side 115 of the sensor body 11 is adjacent to the connecting wall 133, and the detent structure 25 is provided on the connecting wall 133. In some embodiments, the connecting wall 133 is formed as a top portion of the positioning bracket 13, and the first sidewall 131 and the second sidewall 132 may vertically downwardly extend from the connecting wall 133. In some embodiments, the connecting wall 133 extends non-horizontally, but is not perpendicular to the first sidewall 131 and the second sidewall 132. In some embodiments, the toothed structure 22 is provided on a side edge of the top portion of the sensor body 11 (such as a joining edge 118 of a top surface 116 and an outer side surface 117). The first rotary shaft 21 and the second rotary shaft respectively extend towards two sides from the positions of the first side 111 and the second side 112 of the sensor body 11 close to a rear side surface 119.

In some embodiments, the toothed structure 22 comprises a rack 221, and a connecting portion 222 connecting the rack 221 to the sensor body 11. In some embodiments, the connecting portion 222 obliquely extends upward and outward in the vicinity of an intermediate point of the joining edge of the top surface and the outer side surface of the sensor body 11, and the extending direction is perpendicular to the joining edge 118 but not perpendicular to the top surface 116 and the outer side surface 117. The rack 221 extends in a direction roughly perpendicular to the connecting portion 222.

In some embodiments, the detent structure 25 comprises a reed 251 that can be snapped into any notch (equivalent to an opening between adjacent teeth) in the toothed structure 22, and a connecting portion 252 connecting the reed 251 to the positioning bracket 13. In some embodiments, the connecting portion 252 extends downward and outward from the position on the lower surface of the connecting wall 133 of the positioning bracket 13 corresponding to the toothed structure 22, for example, perpendicular to the lower surface of the connecting wall 133. The reed 251 extends in a direction roughly perpendicular to the connecting portion 252.

In some embodiments, the contact position of the toothed structure 22 and the detent structure 25, the mating position of the first shaft 21 and the first rotary shaft receiving portion 23, and the mating position of the second shaft and the second rotary shaft receiving portion 24 may be substantially connected to form a triangular shape.

In the illustrated embodiment, the first rotary shaft 21, the second rotary shaft, and the toothed structure 22 are integrally formed with the sensor body 11, and the first rotary shaft receiving portion 23, the second rotary shaft receiving portion 24, and the detent structure 25 are integrally formed with the positioning bracket 13.

In the sensor assembly 1 of the foregoing embodiment, by providing the sensor body 11 with an angle adjustment tooth and providing the positioning bracket 13 with the detent structure engaged with the angle adjustment tooth, the angle adjustment and positioning of the sensor may be simply and conveniently achieved without an additional adjustment tool. In addition, a stable three-point fixing structure may be formed by means the contact point of the toothed structure 22 and the detent structure 25 and the point of rotation between the sensor body 11 and the positioning bracket 13 thereof.

According to another aspect, the embodiments of the disclosure relate to a vehicle comprising the sensor assembly described above. In light of the above disclosure, those skilled in the art readily obtain a vehicle comprising the sensor assembly described above.

The foregoing specific embodiments are illustrated to provide a thorough and comprehensive understanding of the disclosed content of the disclosure, but the disclosure is not limited to these specific embodiments. It will be apparent to those skilled in the art that various modifications, equivalents, and variations may also be performed on the disclosure without departing from the spirit of the disclosure, which should be within the scope of the disclosure.

The invention claimed is:

1. A sensor assembly for a vehicle, comprising:
a sensor body which comprises a camera, a radar, or a combination thereof; and
a positioning bracket for positioning the sensor body, wherein
a first rotary shaft and a second rotary shaft are respectively provided on opposing first and second sides of the sensor body, and the first rotary shaft and the second rotary shaft are respectively rotatably accommodated in a first rotary shaft receiving portion and a second rotary shaft receiving portion provided on the positioning bracket so as to achieve the rotation of the sensor body relative to the positioning bracket; and
a toothed structure is provided on a third side of the sensor body, other than the first side and the second side, and a detent structure is correspondingly provided on the positioning bracket, and when the sensor body rotates to a desired angle relative to the positioning bracket, fixing of the sensor body relative to the positioning bracket is enabled by means of the engagement between the toothed structure and the detent structure.

2. The sensor assembly according to claim 1, wherein the positioning bracket comprises opposing first and second sidewalls, the sensor body is installed between the first sidewall and the second sidewall such that the first side and the second side of the sensor body are respectively adjacent to the first sidewall and the second sidewall.

3. The sensor assembly according to claim 2, wherein the first rotary shaft receiving portion and the second rotary shaft receiving portion are respectively provided on the first sidewall and the second sidewall.

4. The sensor assembly according to claim 2, wherein the first rotary shaft receiving portion and the second rotary shaft receiving portion are respectively rotary shaft sleeves extending relative to each other from the first sidewall and the second sidewall.

5. The sensor assembly according to claim 2, wherein the positioning bracket further comprises a connecting wall connecting the first sidewall to the second sidewall, the third side of the sensor body is adjacent to the connecting wall, and the detent structure is provided on the connecting wall.

6. The sensor assembly according to claim 5, wherein the connecting wall is formed as a top portion of the positioning bracket, and the toothed structure is provided on a side edge of the top portion of the sensor body.

7. The sensor assembly according to claim 1, wherein the toothed structure comprises a rack.

8. The sensor assembly according to claim 1, wherein the detent structure comprises a reed that can be snapped into any one of notches in the toothed structure.

9. A vehicle, comprising a sensor assembly for the vehicle, the sensor assembly comprising:
a sensor body which comprises a camera, a radar, or a combination thereof; and
a positioning bracket for positioning the sensor body, wherein
a first rotary shaft and a second rotary shaft are respectively provided on opposing first and second sides of the sensor body, and the first rotary shaft and the second rotary shaft are respectively rotatably accommodated in a first rotary shaft receiving portion and a second rotary shaft receiving portion provided on the positioning bracket so as to achieve the rotation of the sensor body relative to the positioning bracket; and
a toothed structure is provided on a third side of the sensor body, other than the first side and the second side, and a detent structure is correspondingly provided on the positioning bracket, and when the sensor body rotates to a desired angle relative to the positioning bracket, fixing of the sensor body relative to the positioning bracket is enabled by means of the engagement between the toothed structure and the detent structure.

* * * * *